Oct. 18, 1966    J. P. ELLSWORTH ET AL    3,280,379
PANELBOARD COMPRISING AN INSULATING
SUPPORT AND A CIRCUIT BREAKER
Filed May 10, 1963    3 Sheets-Sheet 2

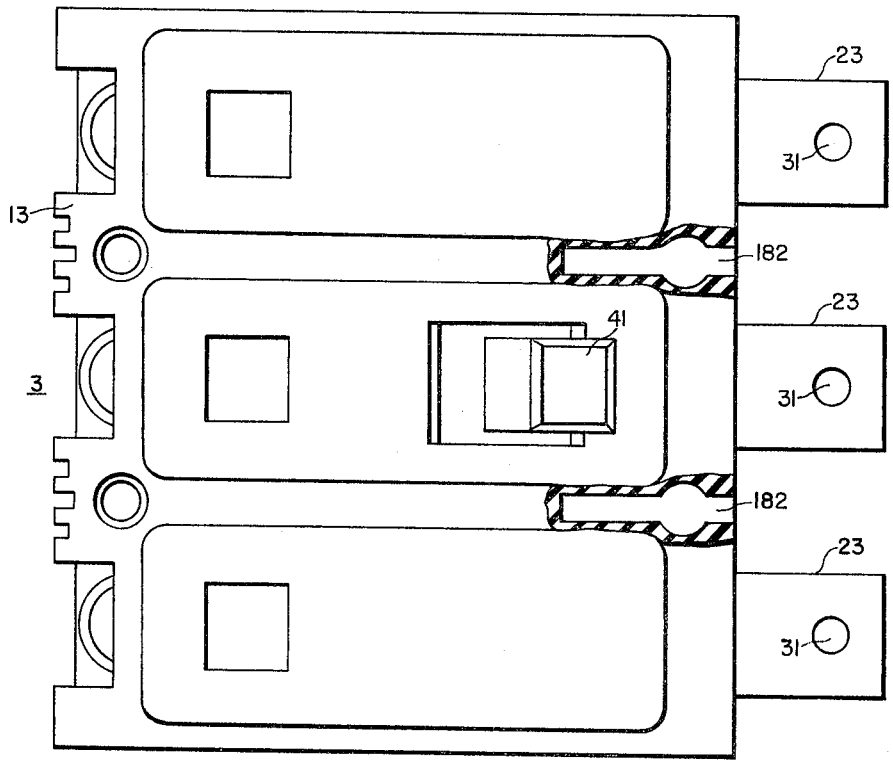
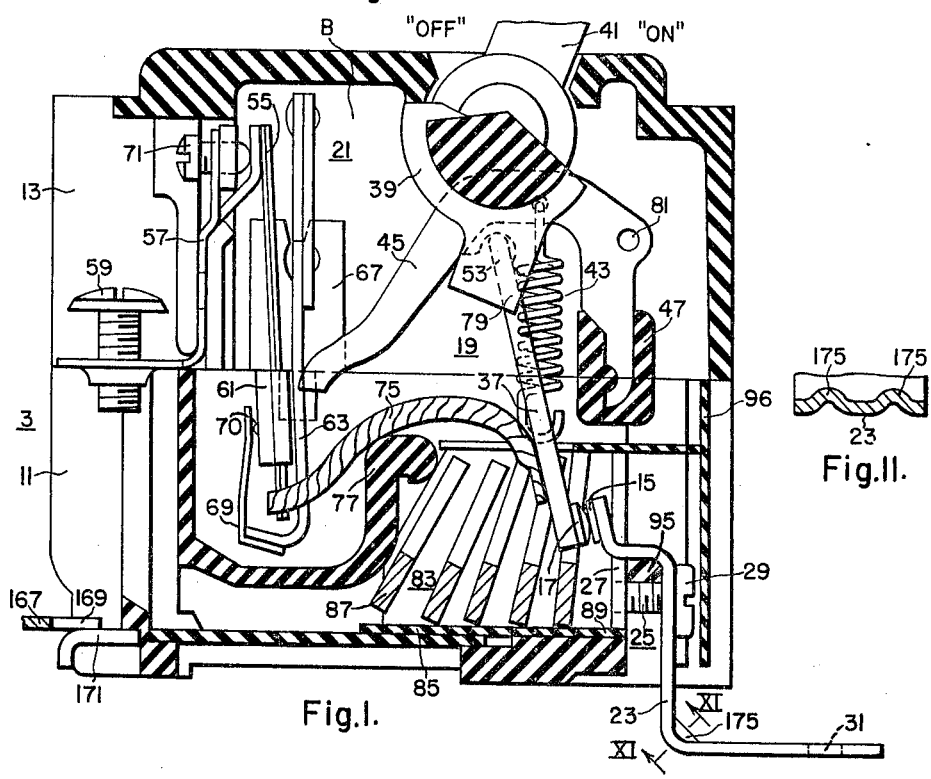
Fig.2.
Fig.1.
Fig.11.

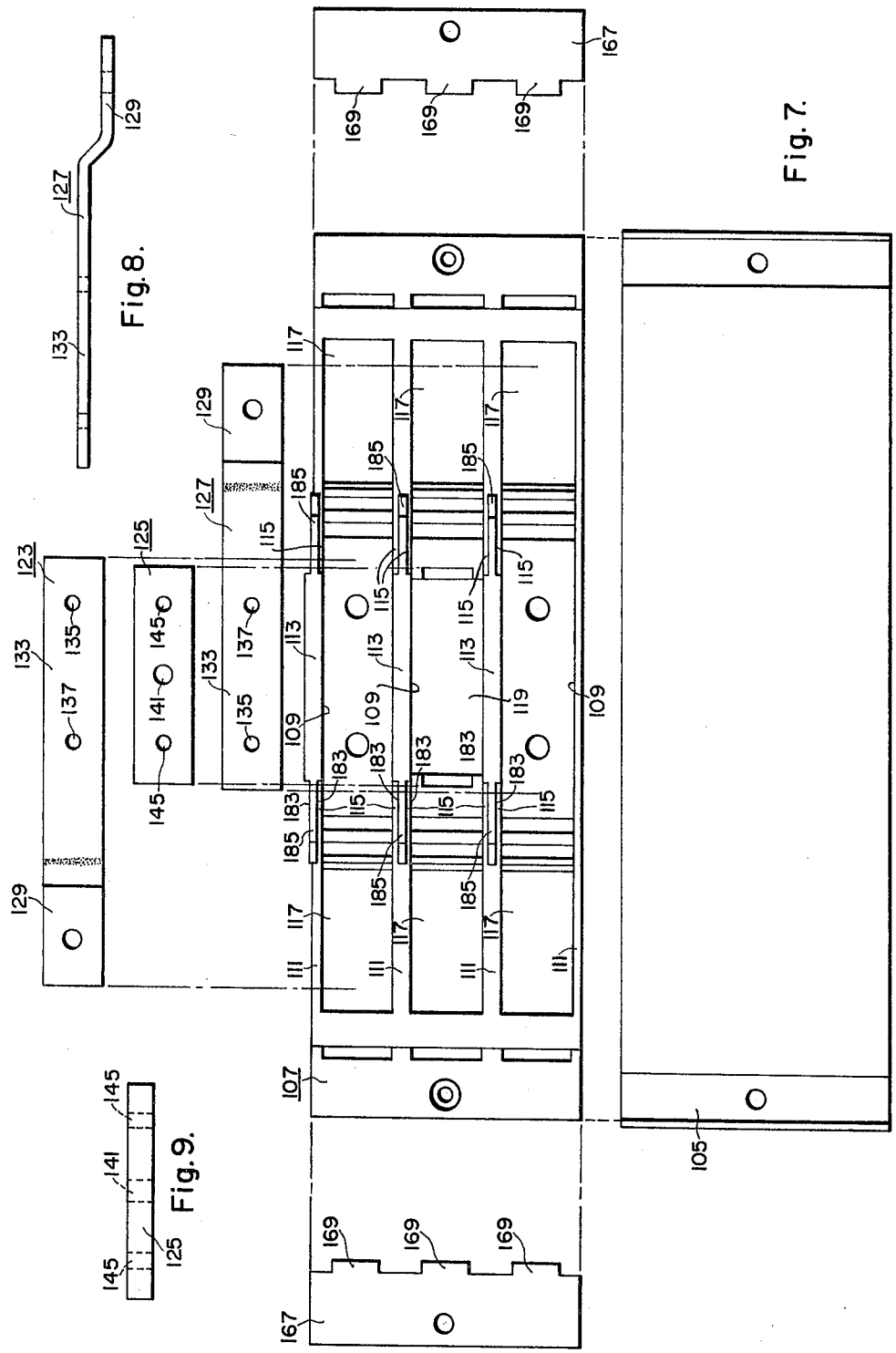

United States Patent Office 3,280,379
Patented Oct. 18, 1966

3,280,379
PANELBOARD COMPRISING AN INSULATING
SUPPORT AND A CIRCUIT BREAKER
James P. Ellsworth and Lloyd W. Dyer, Beaver, Pa., and
Elmer H. Kinney, Elgin, Ill., assignors to Westinghouse
Electric Corporation, Pittsburgh, Pa., a corporation of
Pennsylvania
Filed May 10, 1963, Ser. No. 279,366
3 Claims. (Cl. 317—119)

This invention relates generally to panelboards and more particularly to panelboards of the type that are adapted to have either bolt-on type circuit breakers or plug-in type circuit breakers mounted thereon.

An object of this invention is to provide an improved panelboard that can be economically manufactured and assembled from a plurality of standard parts, which panelboard can accommodate a bolt-on type circuit breaker and, with the addition of an improved plug-in type adapter, a plug-in type circuit breaker.

Another object of this invention is to provide an improved panelboard comprising an improved plug-in adapter to enable connection to the panelboard of a plug-in type circuit breaker, which adapter is readily removable to enable connection to the panelboard of a bolt-on type circuit breaker.

Another object of this invention is to provide an improved panelboard assembly comprising an improved panelboard and an improved bolt-on type circuit breaker operatively mounted on the panelboard.

A further object of this invention is to provide an improved panelboard assembly comprising an improved panelboard and a plug-in type circuit breaker operatively mounted on the panelboard.

Other objects of this invention will be explained fully hereinafter or will be apparent to those skilled in the art.

For a better understanding of the nature and objects of this invention, reference may be had to the following detailed description taken in conjunction with the accompanying drawings, in which:

FIGURE 1 is a side sectional view of an improved bolt-on type circuit breaker, the breaker being shown in the closed position;

FIG. 2 is a top plan view of the circuit breaker seen in FIG. 1;

FIG. 7 is a plan view of the disassembled parts of the panelboard seen in FIG. 3;

FIG. 8 is a side elevational view of one of the conducting connectors seen in FIG. 7;

FIG. 9 is a side elevational view of one of the conducting connectors seen in FIG. 7;

FIG. 11 is a sectional view taken along the line XI—XI of FIG. 1.

Figure 10:
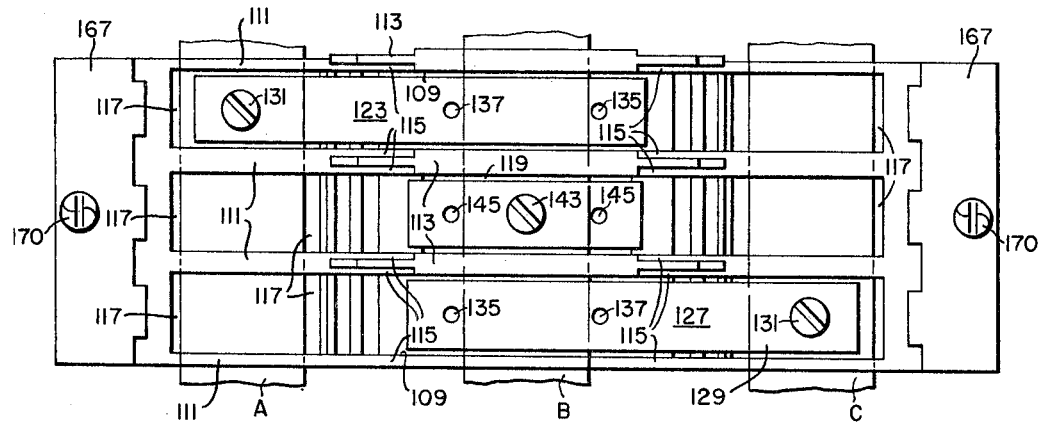
FIG. 10 is a plan view of the assembled panelboard.

Referring to the drawings, a circuit interrupter 3 illustrated in FIGS. 1 and 2 is a circuit breaker of the same general type that is specifically described and claimed in the copending patent application of James P. Ellsworth et al. Serial No. 279,368, filed May 10, 1963, and assigned to the assignee of the instant application. The multipole circuit breaker 3 comprises a housing of molded insulating material which housing comprises a base 11 and a cover 13. Insulating barriers B are molded integral with the housing 11, 13 to separate the adjacent compartments or pole units. The housing 11, 13 encloses a circuit-breaker mechanism comprising a stationary contact 15, a movable contact 17, an operating mechanism indicated generally at 19 and a trip device indicated generally at 21.

The stationary contact 15 is mounted on the inner end of a flat generally rigid line terminal conductor 23 that is secured to the base 11 by fastening means indicated generally at 25. The fastening means 25 comprises a steel nut 27 and a steel screw 29. As will be hereinafter specifically described, the fastening means 25 also serves as an arc runner to enhance extinction of arcs drawn between the contacts 15, 17. An opening 31 is provided in the outer end of the terminal conductor 23 to receive a fastening screw to enable connection of the terminal conductor 23 to a bus bar. A movable contact 17 is rigidly secured to a U-shaped switch or contact arm 37 that is manually operated to open and closed positions by operation of the operating mechanism 19.

The operating mechanism 19 comprises a molded insulating operating member 39 having an external handle portion 41, an over-center spring 43 and a releasable trip member 45. The operating member 39 is rotatably supported between barriers in the cover 13. One end of the releasable trip member 45 is embedded in an insulating support 47 that is rotatably supported on the side walls of the housing 11, 13. The over-center spring 43 is supported, under tension, at one end in an opening in the bight portion of the U-shaped contact arm 37, and at the other end in an opening in the releasable trip member 45. The spring 43 biases the trip member 45 in a counter-clockwise direction, which movement is restrained by means of the trip device 21. As is shown in FIG. 1, the spring 43 biases the contact arm 37 to the closed position.

The circuit breaker 3 is opened manually by counter-clockwise movement of the handle 41 from the "on" position to the "off" position. During this movement, the outer or upper ends 53 of the U-shaped switch arm 37, which ends are positioned in suitable notches in the operating member 39, are carried over to the right of the line of action of the over-center spring 43, whereupon the spring moves the switch arm 37 to the open position with a snap action. The contacts are closed by reverse movement of the operating handle 41, during which movement the outer or upper ends 53 of the switch arm 37 are moved over to the left of the line of action of the over-center spring 43, which spring then moves the switch arm 37 to the closed position with a snap action. There is a separate movable contact arm 37 and spring 43 in each of the three pole units of the multi-pole circuit breaker. All of the contacts are simultaneously moved to the open position since the operating member 39 is a common member extending through all three pole units. Thus, as the handle 41 for the center pole unit is rotated to operate the circuit breaker all three over-center springs 43 and switch arms 37 are simultaneously moved to the "on" and "off" position.

The trip member 45 is released, to effect automatic opening of all of the contacts, by operation of the thermal magnetic trip device 21. The trip device 21 comprises a bimetal 55 that is welded or otherwise attached to an arm portion of a terminal conductor 57, which conductor extends out from the housing 11, 13 and is threadedly engaged by a screw 59 to permit connection of the circuit breaker in an electric circuit. A magnet member 61 is secured to the lower or free end of the bimetal 55. An armature 63 is positioned adjacent the magnetic member 61. The armature 63 is pivotally supported, intermediate its ends, in notches in metallic pivots 67 that are secured to opposite insulating barriers that separate the three compartments of the circuit breaker housing. A metallic strip 69 is secured to the lower end of the armature 63. The strip 69 is shaped to engage a button 70 on the magnet member 61. The free end of the releasable trip member 45 engages a ledge portion in an opening in the armature 63 to be held in the latched position seen in FIG. 1. An adjusting screw 71 is provided to permit adjustment of the normal position of the bimetal 55 to thereby permit calibration of the circuit breaker. There is a similar trip device 21 in each of the pole units of the multi-pole circuit breaker, and the armature 63 are operatively connected to move as a common trip member when an overload occurs in any of the pole units. The member 47 extends through all of the pole units and there is a member 45 in each pole unit attached to the member 47 to support the associated spring 43. Since all of the members 45 will move as a common unitary structure and, since all of the armatures 63 will move as a common unitary structure, only the member 45 in the center pole unit is provided with a latching end to be latched in the position seen in FIG. 1.

When the circuit breaker is in the closed position seen in FIG. 1, a circuit extends through each pole unit from the conductor 23, through the stationary contact 15, the movable contact 17, the contact or switch arm 37, a flexible conductor 75, the bimetal 55, the terminal conductor 57 to a conductor that would be secured to the circuit breaker by means of the screw 59.

Upon the occurrence of an overload circuit below a predetermined value in any of the pole units of the circuit breaker, the associated bimetal 55 is heated and it flexes to the left moving the magnet member 61 and the member 69 to the left to move the armature 63, and therefore all of the armatures for all of the pole units, in a clockwise direction about the pivots 67 to release the trip member 45 in the center pole unit. When the trip member 45 is released, the spring 43 rotates the trip member in a counterclockwise direction until the trip member is arrested by engagement thereof with a molded projection 77. During this movement, the line of action of the spring 43 is moved to the left of the pivot 53 of the switch arm 37, whereupon the spring 43 moves to move the switch arm 37 to the open position with a snap action. Since all of the pivots 47 and all of the spring supports 45 in all of the pole units are operatively connected to pivot in common as a unitary structure, when any one of the pivots 47 is moved, during the tripping movement, all of the switch arms 37 will be automatically moved to the open position. During the tripping movement, the operating member 39 is moved to move the handle 41 to an indicating position between the "on" and "off" positions in a manner well known in the art.

Before the contacts can be closed following an automatic opening operation, it is necessary to reset and relatch the mechanism. This is accomplished by moving the handle 41 to the full "off" position. During this movement, a leg portion 79 of the operating member 39 engages a pin 81 that is secured to the trip member 45 to move the trip member 45 and, therefore all of the pivots 47 and spring supports 45 for all of the pole units back to the position in which the trip member 45 in the center pole unit is latched by the armature 63 in the center pole unit. The armature 63 is biased to the latching position by spring means (not shown). Thereafter, the circuit breaker can be operated in the same manner hereinbefore described.

Upon the occurrence of an overload current above the predetermined value, the magnet member 61 in the overloaded pole unit is energized sufficiently to instantaneously attract the associated armature 63 to move all of the armatures 63 to release the trip member 45 in the center pole unit to thereby effect opening of all of the pole units of the circuit breaker in the same manner hereinbefore described.

As the contacts 15, 17 open, an arc is drawn between the contacts which arc is extinguished to interrupt the circuit controlled by the circuit breaker. An arc extinguishing structure indicated generally at 83 is provided in each pole unit to enhance the rapid extinction of these arcs. The arc extinguishing structure 83 (FIG. 1) comprises an insulating arc wrapper 85 to which is secured a plurality of generally U-shaped steel arc plates 87. The arc wrapper 85 comprises a tail portion 89 that is engaged by the fastening means 25 to hold the arc extinguishing structure 83 in place. When the circuit breaker is assembled, the arc extinguishing structure 83 is placed down into position in the base 11 and, thereafter, the nut or arc runner 27 is dropped down into suitable slots in the insulating housing to rest upon the tail portion 89 of the arc wrapper 85. The terminal conductor 23, with the stationary contact 15 attached thereto, is then placed in position with a portion thereof extending through an opening in the base 11. The terminal conductor 23 rests on a molded projection 95 on the base 11. When the terminal conductor 23 is in position, the screw 29 is passed through a suitable opening in the conductor 23 and is threaded into the tapped opening in the nut 27. The fastening means 25 holds the conductor 23 and the arc extinguishing structure 83 in the positions in which they are seen in FIG. 1. After the terminal conductor 23 is fastened in place, an insulating barrier 96 is placed upwardly into suitable slots in the housing 11 and cemented in place.

In addition to holding the terminal conductor 23 and arc extinguishing structure 83 in place, the fastening means 25 also serves as an arc-runner during circuit interruption. As was hereinbefore described, an arc is drawn between the contacts, 15, 17 during each opening operation and, in the case of an interruption of a severe overload current it is important to extinguish the arc as rapidly as possible in order to prevent damage in the circuit to be protected. As the arc is drawn between the opening contacts, the magnetic lines of force generated around the arc operate through the U-shaped magnetic steel plates 87 to draw the arc downward into the plates, whereupon the arc is broken up into a plurality of arcs to be extinguished in a manner well known in the art. A magnetic steel nut or arc-runner 27 attracts the arc and as the arc is pulled into the arc plates 87 it is transferred from the contact 15 to the member 27. As the arc is transferred from the stationary contact 15 to the arc-runner means 27, 29, it is elongated because it moves in a downward direction away from the movable contact 17, and it is additionally elongated because it moves in a lateral direction away from the movable contacts 17. This rapid and elongating movement of the arc into the arc plates 87 enhances rapid extinction of the arc.

Figure 3:
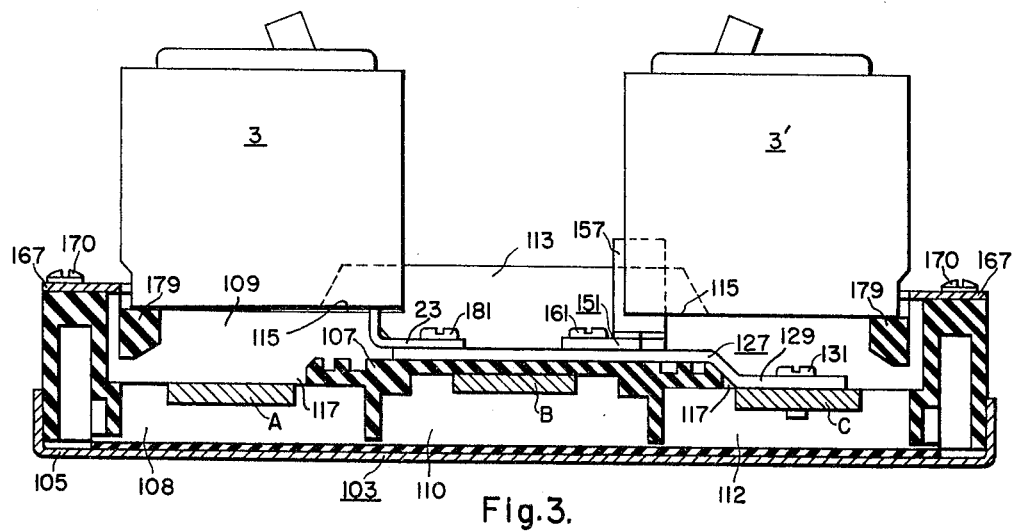
FIG. 3 is a sectional view of a panelboard having a bolt-on type circuit breaker of the type seen in FIG. 1 mounted on one end thereof and a modified plug-in type circuit breaker mounted on the other end thereof.

As can be seen in FIG. 3, the circuit interrupter 3 is mounted on a panelboard 103. The panelboard 103 comprises a back pan 105 and an insulating support or mounting block 107. The insulating support block 107 is molded with three transverse slots 108, 110 and 112 in the back thereof for receiving three bus bars A, B and C, respectively.

As can be seen in FIG. 7, the insulating support block 107 is molded with three adjacent longitudinal cavities 109 each of which cavities 109 extends almost the entire length of the mounting block 107. Barriers 111 form the side walls of the cavities 109. The barriers 111 are formed with higher parts 113 at the center portion thereof.

There is no higher part 113 on the lowest barrier 111 (FIGS. 7 and 10) since when two support blocks 107 are disposed in a substantially abutting relationship, the higher part 113 of one of the support blocks will always be disposed between adjacent cavities of adjacent support blocks. The barriers 111 are formed with ledge portions 115 for engaging the base of a plug-in breaker to support one end of the plug-in breaker in a manner to be hereinafter specifically described. A plurality of openings 117 are provided at each of the two opposite ends of the insulating support 107. An opening 119 is provided in the center cavity 109. When the insulating support block 107 is disposed over the bus bars A, B and C, one of the bus bars will extend transversely under the openings 117 at one end of the insulating mounting block, one of the bus bars will extend transversely under the opening 119 in the mounting block, and the other bus bar will extend transversely under the openings 117 at the other end of the mounting block 107 (FIGS. 3 and 10).

Three conducting connectors 123, 125 and 127 are provided with each support block 107 in a panelboard. The conducting connectors 123 and 127 are identical. For this reason only the conductor 127 is shown in side elevation in FIG. 8. The conductor 125 is shown in side elevation in FIG. 9. As is shown in FIGS. 3 and 10, the conducting connector 127 is disposed in one of the end cavities 109 and a lower portion 129 thereof engages the bus bar C that is accessible to this lower portion through one of the openings 117. A screw 131 passes through a suitable opening in the connector 127 and another opening in the bus bar C to connect the connector 127 to the bus bar C. The upper portion 133 of the connector 127 has two openings 135 and 137 (FIGS. 7 and 10) therein to enable connection thereto of a bolt-on type circuit breaker or a plug-in adapter in a manner to be hereinafter specifically described. The conducting connector 123 is identical to the conducting connector 127. For this reason, the same reference characters are applied to the detailed parts of the connector 123. The conducting connector 125 is provided with a central opening 141 (FIG. 7) therein to receive a screw 143 (FIG. 10) to connect this member to the center bus bar B. The conducting connector 125 is accessible to the bus bar B through the opening 119 (FIG. 7) in the insulating support block 107. Openings 145 are provided on each of the two opposite sides of the opening 141 in order to enable connection to the connector 125 of a bolt-on type circuit breaker or a plug-in adapter in a manner to be hereinafter specifically described. As can be seen in FIG. 10, the conducting connector 123 is disposed in the upper cavity and it is connected to the bus bar A by means of a screw 131. As can be seen in FIG. 10, the openings 135, 137, and 145 are so aligned that one or more circuit breakers can be mounted at either of the two opposite ends of the support block 107 and connected to the associated conducting connectors. If a three-pole circuit breaker is mounted on the mounting block, each pole unit will be disposed over and be connected to a different one of the conducting connectors 123, 125 and 127. If it is desired, three single pole circuit breakers can be mounted at each of the two opposite ends of the mounting block 107 with each of the single pole circuit breakers being connected to one of the conducting connectors 123, 125 or 127. Each of the single pole circuit breakers will comprise a single insulating compartment and pole unit of the type seen in FIG. 1.

Referring to FIG. 3, it will be seen that a bolt-on type circuit breaker 3 is provided at one end of the mounting block 107 and a plug-in type circuit breaker 3' is provided at the other end of the mounting block 107.

Figure 4:
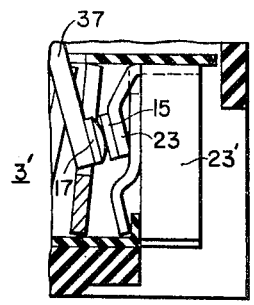
FIG. 4 is a partial view illustrating how the circuit breaker of FIG. 1 is modified as a plug-in type circuit breaker.
Figure 5:
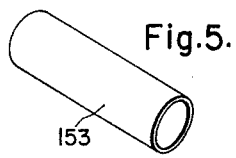
FIG. 5 is a perspective view of a conducting tube that is formed in a manufacturing process into a plug-in adapter.
Figure 6:
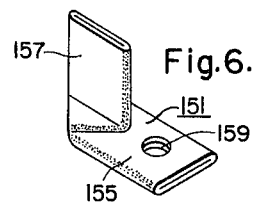
FIG. 6 is a perspective view of a plug-in adapter formed from the conducting tube seen in FIG. 5.

Referring to FIG. 4, it will be seen that a part of a circuit breaker 3' is shown in section therein. The circuit breaker 3' is identical to the circuit breaker 3 except for the line terminal end thereof that is shown in FIG. 4. As is seen in FIG. 4, the conductor 23 is electrically and physically connected to a clip-on type terminal structure 23' of a type well known in the art. The clip-on type terminal structure 23' is adapted to be clipped onto a plug-in adapter 151 shown in FIG. 6. The plug-in adapter 151 (FIG. 6) is formed from a one-piece tubular conductor 153 (FIG. 5). The member 153 is stamped into a generally flat member and folded so that there is a lower flat supporting part 155 and an upper flat stab 157 generally normal to the support 155. An opening 159 is provided in the plug-in adapter 151 to enable connection of the adapter to one of the conducting connectors 123, 125 or 127. Referring to FIG. 3, a screw 161 passes through the opening 159 (FIG. 6) in the plug-in adapter 151 to secure the adapter to the conducting connector 127.

Although there is shown in FIG. 3 a bolt-on type circuit breaker 3 mounted on one end of the mounting block 107 and a plug-in type circuit breaker 3' mounted on the other end, in practice generally all of the circuit breakers in a particular panelboard are either bolt-on or plug-in type circuit breakers. The two different types of circuit breakers are shown in FIG. 3 in order to avoid the necessity of another similar drawing.

A plate 167 having three extended parts 169 thereon is attached to each of the two opposite ends of the support block 107 by means of a one-way screw 170 (FIG. 3). The one-way screw is a type well known in the art that requires a special tool for removal thereof. The load end of the circuit breaker 3 (FIG. 3) is supported on a ledge 179 that is molded integral with the support block 107. In each pole unit the circuit breaker is provided with a clip 171 (FIG. 1) that fits under one of the extended portions 169 of the plate 167 to prevent upward movement of the load end of the bolt-on type circuit breaker 3. The line end of the circuit breaker 3 is supported on the conducting connectors 123, 125 and 127 by means of the line terminal conductors 23. As can be seen in FIGS. 1 and 11, the line terminal conductors 23 are reenforced at the bent part thereof, in order to provide for more adequate support and to prevent distortion of the conductors 23, by means of two re-enforcing ribs 175 that are stamped in each member 23 during the manufacturing process. A screw 181 is used to secure each of the conductors 23 to the associated conducting connector. The load end of the plug-in type circuit breaker 3' is supported on a ledge 179 that is molded integral with support block 107, and the line end thereof is supported on the ledges 115 (FIGS. 3 and 7) that are disposed on opposite sides of the cavities 117.

The barriers 113 (FIGS. 3 and 7) are constructed to provide insulation between the adjacent poles. The housings of the multi-pole circuit breaker are formed with slots 182 (FIG. 2) between adjacent pole units, each of which slots receives one of the relatively thin barrier portions 185 (FIG. 7). When single-pole circuit breakers are mounted on the panelboard, the thin portions 185 (FIG. 7) of the barriers 113 are disposed between adjacent circuit breakers. It is desirable to keep the barriers 113 relatively thin to enable the construction of a more compact panelboard. It is particularly desirable to keep the end parts 185 of the barriers 113 thin so that they can fit within the slots 182 (FIG. 2) in the multi-pole breaker housing. Moreover, with the provision of thin end parts 185, single pole breakers can be mounted on the panelboard in a closer side-by-side relationship. Since the barriers 113, 185 are relatively thin, it is desirable to keep them low in height so that they will not be easily broken. With the provision of the line terminal conductors 23 extending from the bottom of the associated insulating compartments or pole units, adequate insulation between adjacent poles is achieved with relatively low barriers 113, 185. The barriers 113, 185 are low enough so that, even though they are relatively thin, they can be molded integrally with the support block 107. Although, as can be seen in FIG. 3, the stab part 157 of the plug-in adapter 151 extends higher than the barriers 113, since these stab parts are thin (FIG. 6), there is adequate air clearance and insulation between adjacent plug-in adapters.

From the foregoing, it can be understood that there is provided by this invention an improved compact panelboard assembly comprising an elongated insulating mounting block disposed over a plurality of bus bars, which mounting block has a plurality of cavities in the front thereof and a rigid conducting connector disposed in each cavity, each of which conducting connectors is connected to one of the bus bars. An insulating barrier is provided on each of the two opposite sides of each cavity. A multi-pole bolt-on type circuit breaker is mounted on the support block and a generally flat and generally rigid re-enforced one-piece line terminal conductor extends from the bottom of each pole unit with the external end part thereof being disposed in a plane generally parallel to the bottom of the breaker. Each line terminal conductor rests on one of the conducting connectors whereby the line terminal conductors support the line end of the bolt-on type circuit breaker on the conducting connectors and they electrically connect the circuit breaker with the conducting connectors. Each line terminal conductor has an opening at the outer end thereof that is aligned with an opening in the associated conducting connector and a fastening member extends into each pair of openings to secure the associated conductors together. The insulating housing of the multipole circuit breaker is provided with a slot between each pair of adjacent poles each of which slots receives one of the insulating barriers. With the conducting connectors extending from the bottom of the breaker, adjacent poles can be adequately insulated by means of relatively low and thin barriers that are molded integrally with the insulating support block. The panelboard assembly can also comprise double-pole circuit breakers mounted in the same general manner as the three-pole circuit breakers are mounted. The panelboard assembly can also comprise a plurality of single-pole circuit breakers mounted in a close side-by-side relationship. The panelboard can be adapted to receive plug-in type circuit breakers merely with the addition thereto of an improved plug-in adaptor for each pole unit. The plug-in adaptor comprises a one-piece member formed from a conducting tube and comprising a generally flat support end adapted to be connected to the associated conducting connector, and a generally flat stab end for receiving a clip-on type terminal of a pole unit of a plug-in type circuit breaker.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A panelboard assembly comprising, in combination, an elongated insulating support block having three parallel transversely extending slots in the back thereof, said support block being mounted over three parallel transversely extending bus bars with each of said bus bars being disposed in one of said slots, said support block having three parallel elongated cavities in the front thereof which cavities extend in a direction generally normal to the direction of said slots and bus bars, a different conducting connector disposed in each of said three cavities with each of the three conducting connectors being connected to a different one of said three bus bars, two circuit breakers on said support block in a spaced aligned end-to-end relationship aligned in a direction normal to the direction of said slots and bus bars and with the load end of each of said circuit breakers being supported on said support block and with the line ends of said circuit breakers being in a spaced face-to-face relationship, each of said circuit breakers comprising a pole unit comprising an insulating compartment, each of said insulating compartments comprising a bottom and a front opposite the bottom, a separate pair of cooperable contacts disposed within each of said insulating compartments, each of said insulating compartments having opening means therein at the front thereof, a separate operating handle extending through the opening means in the front of each of said insulating compartments, each of said operating handles being operable to open and close the associated contacts, each of said insulating compartments having opening means at the bottom thereof in proximity to the line end of the associated circuit breaker, a separate unitary generally rigid line-terminal conductor supported in each of said insulating compartments and protruding through the opening means in the bottom of the associated insulating compartment, in each of said insulating compartments one of the contacts being supported on the inner part of the associated unitary generally rigid line-terminal conductor, each of said unitary generally rigid line-terminal conductors at the outside of the associated insulating compartment extending below the lowermost part of the associated insulating compartment and being shaped to provide an external end part thereof disposed along a plane generally parallel to the bottom of the associated insulating compartment, each of said external end parts comprising a connecting part, each of said connecting parts extending away from the associated insulating compartment below the lowermost part of the associated insulating compartment in a direction toward the line end of the other of said circuit breakers, each of said connecting parts having opening means therein which opening means is disposed outside the front-elevational-view dimensions of the associated insulating compartment and which opening means is disposed in the space between said line ends of said circuit breakers, each of said external end parts resting on one of said conducting connectors whereby each of said end parts electrically connects the associated pole unit with the associated conducting connector and provides physical support for the line end of the associated pole unit on the associated conducting connector, separate securing means for each of said pole units, each of said separate securing means being disposed in the associated opening means in the associated connecting part and removably securing the associated unitary generally rigid line-terminal conductor to the associated conducting connector, and each of said separate securing means being accessible for operation by an elongated generally straight screwdriver-type tool from the front of said panelboard assembly in the space between said line ends of said circuit breakers.

2. A panelboard assembly comprising, in combination, an insulating support block having three parallel transversely extending slots in the back thereof, said support block being mounted over three parallel transversely extending bus bars with each of said bus bars being disposed in one of said slots, said support block having three longitudinally extending parallel cavities in the front thereof, a different conducting connector disposed in each of said three cavities with each of said three conducting connectors being connected to a different one of said bus bars, two three-pole circuit breakers, each of said circuit breakers having a line end and a load end, said circuit breakers being on said support block in a spaced aligned end-to-end relationship aligned in a direction normal to the direction of said slots and bus bars and with the load end of each of said circuit breakers being supported on said support block and with the line ends of said circuit breakers being in a spaced face-to-face relationship, each of said circuit breakers comprising an insulating housing, each of said insulating housings comprising a bottom and a front opposite the bottom, each of said insulating housings comprising three insulating compartments for the three pole units of the associated circuit breaker, each of said pole units comprising a pair of cooperable contacts disposed within the associated compartment, each of said circuit breakers at the front thereof having opening means therein, each of said circuit breakers comprising a separate operating handle extending through the opening means in the front of the circuit breaker, each of said operating handles being operable to simultaneously open and close the three pair of contacts of the associated circuit breaker, each of said insulating housings at the bottom thereof having opening means therein in proximity to the line end of the associated circuit breaker, a separate unitary generally rigid line-terminal conductor in each of said compartments of each of said circuit breakers supported on the associated housing and protruding through the opening means in the bottom of the associated housing, in each of said compartments one of the contacts being supported on the inner part of the associated unitary generally rigid line-terminal conductor, each of said unitary generally rigid line-terminal conductors at the outside of the associated insulating housing extending below the lowermost part of the associated housing and being shaped to provide an external end part thereof disposed along a plane generally parallel to the bottom of the associated housing, each of said external end parts comprising a connecting part, each of said connecting parts extending away from the associated housing below the lowermost part of the associated housing in a direction toward the line end of the other of said two circuit breakers, each of said connecting parts having opening means therein, each of said connecting parts and opening means being disposed outside the front-elevational-view dimension of the associated housing, the three unitary generally rigid line-terminal conductors of each of said circuit breakers engaging said three conducting connectors with each of said unitary generally rigid line-terminal conductors engaging a separate one of said three conducting connectors and with the three unitary generally rigid line-terminal conductors providing physical support for the line end of the associated circuit breaker and electrically connecting the associated three pairs of contacts with said three conducting connectors, a separate connecting means in each of said opening means removably securing the associated unitary generally rigid line-terminal conductor to the associated conducting connector, and each of said six connecting means being disposed in said space between the line ends of said insulating housings and being accessible for operation by an elongated generally straight screwdriver-type tool from the front of said panelboard assembly.

3. A panelboard assembly according to claim 2, said support block comprising insulating barrier means between adjacent cavities, each of said insulating housings having a pair of slots therein at the bottom of the housing, and said insulating barrier means of said support block extending into said pairs of slots of said two housings to insulate the adjacent unitary generally rigid-line-terminal conductors of each of said circuit breakers from each other.

References Cited by the Examiner

UNITED STATES PATENTS

| | | | |
|---|---|---|---|
| 2,766,405 | 10/1956 | Edmunds | 317—119 |
| 3,205,173 | 9/1963 | Kindon | 317—119 |
| 3,144,587 | 8/1964 | Darlow | 317—119 |

ROBERT K. SCHAEFER, *Primary Examiner.*

ROBERT S. MACON, JOHN F. BURNS, KATHLEEN H. CLAFFY, *Examiners.*

S. H. BOYER, J. J. BOSCO, *Assistant Examiners.*